United States Patent
Spies et al.

(10) Patent No.: US 11,338,646 B2
(45) Date of Patent: May 24, 2022

(54) DEVICE FOR DISTRIBUTING THE COOLANT IN AN AIR-CONDITIONING SYSTEM OF A MOTOR VEHICLE

(71) Applicant: Hanon Systems, Daejeon (KR)

(72) Inventors: Toni Spies, Cologne (DE); Navid Durrani, Kerpen (DE); Philipp Kozalla, Cologne (DE)

(73) Assignee: Hanon Systems, Daejeon (KR)

( * ) Notice: Subject to any disclaimer, the term of this patent is extended or adjusted under 35 U.S.C. 154(b) by 253 days.

(21) Appl. No.: 15/943,205

(22) Filed: Apr. 2, 2018

(65) Prior Publication Data
US 2018/0281562 A1    Oct. 4, 2018

(30) Foreign Application Priority Data
Apr. 4, 2017   (DE) .......................... 102017205744.0

(51) Int. Cl.
| | |
|---|---|
| *B60H 1/00* | (2006.01) |
| *F25B 9/00* | (2006.01) |
| *F25B 25/00* | (2006.01) |
| *F25B 40/00* | (2006.01) |
| *B60H 1/32* | (2006.01) |

(52) U.S. Cl.
CPC ..... *B60H 1/00907* (2013.01); *B60H 1/00885* (2013.01); *B60H 1/00899* (2013.01); *B60H 1/32284* (2019.05); *F25B 25/005* (2013.01); *F25B 40/00* (2013.01); *B60H 2001/00928* (2013.01); *B60H 2001/00942* (2013.01); *F25B 9/008* (2013.01); *F25B 2339/047* (2013.01)

(58) Field of Classification Search
CPC ............ B60H 1/32284; B60H 1/00899; B60H 1/00885; B60H 2001/00928; B60H 1/3233; B60H 1/32281; B60H 1/00907; B60H 2001/00942; B60H 1/323
See application file for complete search history.

(56) References Cited

U.S. PATENT DOCUMENTS

| | | | |
|---|---|---|---|
| 7,063,137 B2 | 6/2006 | Kadle et al. | |
| 2004/0089003 A1* | 5/2004 | Amaral | B60H 1/00907 62/186 |
| 2010/0281902 A1* | 11/2010 | Kakizaki | B60H 1/3227 62/239 |

(Continued)

FOREIGN PATENT DOCUMENTS

| | | |
|---|---|---|
| DE | 102004008210 A1 | 9/2005 |
| DE | 102016006682 A1 | 11/2017 |
| JP | 2012011928 A | 1/2012 |

(Continued)

*Primary Examiner* — Cassey D Bauer
(74) *Attorney, Agent, or Firm* — Norton Rose Fulbright US LLP; James R. Crawford (57) ABSTRACT

A heat pump system for a motor vehicle comprises at least two heat exchangers 10, 12, through which, for heating and/or cooling the motor vehicle interior, a flow is conducted, and at least two coolant circulations 14, 16 separable from one another, of which at least one is connectable, independently of the other coolant circulation, with one, two or more heat exchangers 10, 12 such that through these, in the presence of a connection with two or more heat exchangers 10, 12, a flow is successively conducted and the other coolant circulation is connectable with at least one heat exchanger 10, 12.

19 Claims, 9 Drawing Sheets

(56) References Cited

U.S. PATENT DOCUMENTS

2016/0297283 A1* 10/2016 Sakamoto ............... F25B 47/02
2017/0253105 A1* 9/2017 Allgaeuer .......... B60H 1/00385

FOREIGN PATENT DOCUMENTS

| JP | 2014189141 A | 10/2014 |
|----|--------------|---------|
| JP | 2015182575 A | 10/2015 |
| KR | 20110117459 A | 10/2011 |
| KR | 101558823 B1 | 10/2015 |

* cited by examiner

DEVICE FOR DISTRIBUTING THE COOLANT IN AN AIR-CONDITIONING SYSTEM OF A MOTOR VEHICLE

CROSS REFERENCE TO RELATED APPLICATIONS

This application claims priority from German Patent Application No. 102017205744.0 filed Apr. 4, 2017, which is hereby incorporated by reference in its entirety.

FIELD OF TECHNOLOGY

The invention relates to a device for the distribution of coolant in a motor vehicle, with at least two coolant circulations as well as one refrigerant circulation. The coolant circulation, developed for the combined operation in chiller mode, heat pump mode and post-heating mode, comprises two coolant-air heat exchangers. To condition the incoming air of the passenger compartment, the temperature level of the coolant in the coolant-air heat exchangers is provided by a refrigerant circulation. The refrigerant circulation typically comprises at least one compressor, an expansion element for relieving the refrigerant from a high to a lower pressure level, a refrigerant-coolant heat exchanger operable as condenser/gas cooler as well as a refrigerant-coolant heat exchanger, operable as evaporator, for the heat transfer between the refrigerant of the refrigerant circulation and the coolant of the coolant circulation.

Depending on the ambient temperature, the interior compartment of a motor vehicle has to be heated or cooled or dehumidified for the comfort of the passengers.

Special challenges are encountered, for example, in heating electric vehicles since in this case the waste heat of an engine is not available at the magnitude customary with combustion engines. Heat pump systems with secondary circulation employed herein, which operate for example with the refrigerant R744, are potentially limited in view of their heating capacity.

In the case of the principle of indirect heat transfer that forms the basis of the invention, the efficiency of the overall system in heat pump operation is, in addition, significantly dependent on the input temperature of the coolant in the refrigerant-coolant heat exchanger operated as condenser/gas cooler. In the formation of the heat exchanger as a counter flow heat exchanger the refrigerant in the ideal case can be cooled down to the input temperature of the coolant into the heat exchanger. With increasing temperature of the flow temperature of the coolant the output temperature of the refrigerant from the heat exchanger consequently also increases, and therewith the transferred enthalpy difference in the heat exchanger decreases.

In particular when operating the air-conditioning system in heat pump operation, at very low temperatures of the ambient air in the range of −15° C. to −20° C., flow temperatures of the coolant in the range of approximately 55° C. to 60° C. must be sought in order to be able to condition the passenger compartment to pleasant temperatures in as short a time as possible. In this operation the refrigerant at the outlet of the refrigerant-coolant heat exchanger in the ideal case has a temperature of more than 55° C. However, in order to be able to operate the air-conditioning system more efficiently, the refrigerant must be cooled to a temperature far below the flow temperature of the coolant to be able to attain as large an enthalpy difference as possible.

As a rule, the above described coolant circulation is operated at a coolant temperature above the level of the ambient temperature and serves for heating the passenger compartment as well as also for the heat emission to the surroundings. Challenges similar to those described above exist in a parallel coolant circulation that is operated at low temperature (as a rule below the ambient level) and serves primarily for cooling the motor vehicle interior or vehicle components. Here, the coolant is cooled in a further refrigerant-coolant heat exchanger by the refrigerant and the higher the input temperature of the coolant, the higher is the coefficient of performance (COP) of the heating/cooling mechanism.

There is, in addition, the requirement in refrigerant-air heat exchangers that the air conditioned downstream of the heat exchangers can only have small temperature differences so as not to impair the comfort of the passengers. This requirement leads to a permitted maximal temperature difference of the coolant between input and output out of the heat exchangers of approximately 10 to 15 K.

PRIOR ART

A conventional heat pump system is described in U.S. Pat. No. 7,063,137 B2. However, this system cannot solve the above described problems.

DESCRIPTION OF THE INVENTION

The invention addresses the problem of improving the coefficient of performance or COP of a heat pump system having a secondary circulation without compromising the comfort of the vehicle passengers.

This problem is resolved through the heat pump system described in Claim 1 and, accordingly, the heat pump system according to the invention for a motor vehicle comprises at least two coolant-air heat exchangers through which, for the purpose of heating and/or cooling the motor vehicle interior, flows air. Further provided are at least two coolant circulations, separate from one another, of which at least one is connectable independently of the other with one, two or more coolant-air heat exchangers, such that, in the presence of a connection with two or more coolant-air heat exchangers, through these a flow can be conducted successively, and the other coolant circulation is connectable with at least one coolant-air heat exchanger.

The fundamental concept of the invention resides in conducting the flow successively through the two coolant-air heat exchangers in the case of heating and/or cooling such that, depending on the operational state, lower input temperatures of the coolant when entering the refrigerant-coolant heat exchanger at the high-pressure side, referred to the refrigerant, or higher input temperatures of the coolant when entering into the refrigerant-coolant heat exchanger at the low-pressure side, referred to the refrigerant, in which exchangers the heat transfer from or to the refrigerant takes place, are achievable. This is essentially achieved thereby that by flowing successively through two coolant-air heat exchangers the coolant is heated more strongly in cooling mode and cools down more strongly in heating mode. This effect can additionally be intensified since, through the serial throughflow of the coolant-air heat exchangers, the coolant volume flow can simultaneously be reduced without increasing the air-side temperature difference downstream of the last coolant-air heat exchanger.

The invention furthermore enables an operation in which one coolant-air heat exchanger cools the air and the other heats it in order to, first, dehumidify and subsequently to heat it, i.e. a so-called post-heat or reheat operation can be realized.

It should, moreover, be emphasized that the heat pump system according to the invention is independent of details of the refrigerant circulation, such as, for example, the refrigerant used or the number of evaporators, chillers or condensers. In particular cooling for the battery of an electric vehicle can also be provided. Furthermore, there can be additional heat sources and/or heat sinks. As will be explained in further detail in the following, the valves, required for the described distribution and the stated switching capabilities, can be integrated into a single part.

Preferred further developments are described in the other claims.

As already indicated, the connection between the coolant circulations and the coolant-air heat exchangers can be implemented in a single part in the form of a distributor.

It is preferred for at least two, in particular preferred three, 3/2 way valves to be provided, each of which can be replaced by two shut-off valves.

Especially diverse and versatile operating options are hereby obtained if a 3/2 way valve has a direct inlet on the side of a first coolant circulation and an outlet in the direction toward the other coolant circulation, as will be described in greater detail in the following with reference to the Figures.

At least one 3/2 way valve is further provided that comprises a direct inlet on the side of one heat exchanger, an outlet in the direction toward the one coolant circulation and an outlet in the direction toward the other coolant circulation.

Further, at least one shut-off valve, or alternatively, one check valve, is preferably provided that prevents the return flow of coolant to a pump of a coolant circulation. This valve is optionally provided in the event that said pump is not laid out to be self-sealing while not in operation.

In regard to all valves, it should be emphasized that they may not only be provided as a single part in a distributor but rather can be provided, at least to some extent, at other sites in the two coolant circulations.

In view of the heat exchangers for cooling or heating the air in the motor vehicle interior compartment, it is preferred for at least the heat exchangers serving for cooling/dehumidifying of the air, to comprise a drainage for the moisture extracted from the interior air.

In view of an efficient structure it is of further advantage for both coolant circulations to be connected with a common refrigerant circulation and for a heat exchange to take place between the refrigerant circulation and both coolant circulations.

BRIEF DESCRIPTION OF THE DRAWING

In the following preferred embodiment examples of the invention will be described in further detail with reference to the drawing.

Therein depict.

DETAILED DESCRIPTION OF PREFERRED EMBODIMENTS OF THE INVENTION

First, an explanation will be given regarding the heat pump system depicted in FIG. 1 with reference to the left, here in particular the center region, in which a refrigerant circulation, for example with R744 as the refrigerant, is provided which comprises a compressor Comp, a refrigerant-coolant heat exchanger WGC for heating the coolant in a first coolant circulation 14 and a refrigerant-coolant heat exchanger Chiller for cooling a coolant in a second coolant circulation 16. Further provided are an expansion valve EXV and an internal heat exchanger with integrated collector Accu/IHX. Each coolant circulation, depicted in the upper and lower left comprises a (coolant-air heat exchanger) radiator LTR and two pumps, one of which is disposed directly upstream of the radiator and the other in a line leading off in the direction toward the coolant-air heat exchangers 10 and 12 depicted on the right in the Figure, which, in the following will be denoted as heat exchangers for the sake of simplicity. It should be stated that the first heat exchanger 10, always located upstream, serves primarily for cooling/dehumidifying the air, and the second heat exchanger 12, always located downstream, serves primarily for heating the air. The two heat exchangers 10, 12 belong to a heating, ventilation and cooling system, denoted as HVAC or air conditioning unit. Denoted by Coolant Distributor is a coolant distributor of the depicted embodiment and "System" denotes the combination of refrigerant circulation and the two coolant circulations. The arrows in all Figures indicate the flow in the particular direction of the arrow.

Both heat exchangers 10 and 12 can advantageously be utilized with especially high efficiency for heating, such that advantageously an especially substantial cooling of the coolant in the first coolant circulation 14, shown in the Figure on top, takes place when the flow of the coolant in this coolant circulation takes place in the manner as follows.

The pump provided in the line leading to the heat exchanger 12 conveys the coolant in the direction toward this heat exchanger 12, and, by means of a 3/2 way valve labeled 3, the coolant, after it has passed through the heat exchanger 12, continues to flow in the direction toward the other coolant circulation 16 and here through the first heat exchanger 10. By means of a 3/2 way valve labeled 1, it is returned to the first coolant circulation 14, in particular through the heat exchanger WGC for the renewed heating of the coolant. In this case the radiator LTR does not carry any flow. The coolant in the second coolant circuit 16 flows further through solely the pump, the radiator LTR and the cooler [Chiller], however does not reach in the direction of the heat exchangers 10, 12.

Thereby that the flow is successively conducted through both heat exchangers 12, 10, the above described effects according to the invention are achieved. The flow of air through the heat exchangers 10, 12 on the one hand, and, on the other hand, the flow of coolant through the heat exchangers 10, 12 can be implemented as counter or transverse flow or cross/counter flow. The air conducted into the interior of the motor vehicle is consequently heated in two stages. For the sake of completeness, it should be mentioned that in the depicted embodiment a shut-off valve or check valve 4 is provided that is optional and prevents a backflow of the coolant to the pump, which is advantageous in case this pump is not sealed tightly when this pump is switched off and therefore would enable an unintentional bypass.

Figure 1:
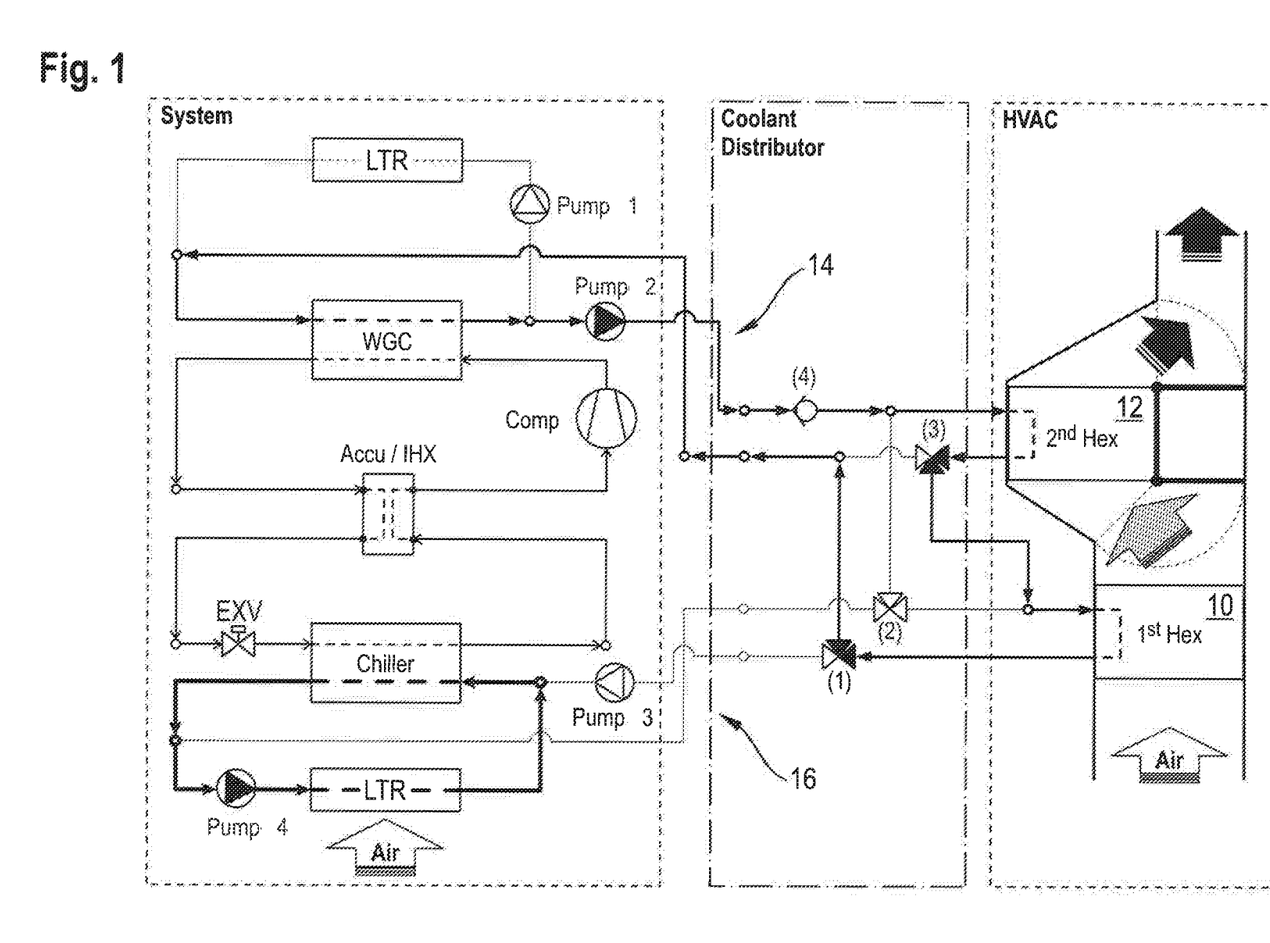
FIG. 1 a first embodiment of the heat pump system according to the invention during heating, FIG. 2 the first embodiment of the heat pump system according to the invention during cooling, FIG. 3 the first embodiment of the heat pump system according to the invention during dehumidifying, FIG. 4 a second embodiment of the heat pump system according to the invention during heating, FIG. 5 the second embodiment of the heat pump according to the invention during cooling, FIG. 6 the second embodiment of the heat pump system according to the invention during dehumidifying, FIG. 7 a third embodiment of the heat pump system according to the invention during heating, FIG. 8 the third embodiment of the heat pump system according to the invention during cooling, FIG. 9 the third embodiment of the heat pump system according to the invention during dehumidifying.
Figure 2:
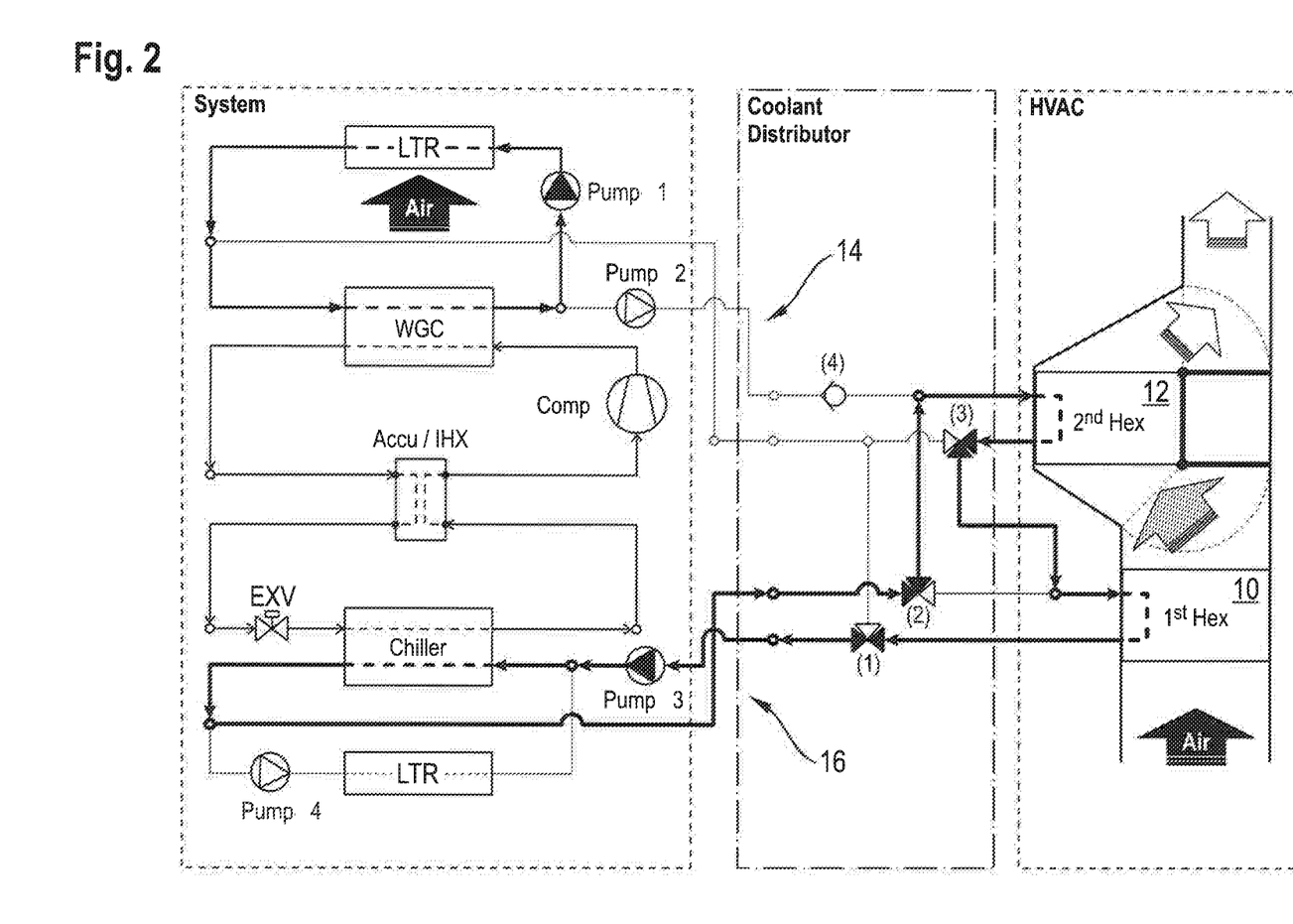

FIG. 2 shows the case of two-stage cooling of the air conducted through the heat exchangers 10 and 12, thereby that the coolant of the second coolant circulation 16 is initially conducted, through the appropriate setting of the 3/2 way valve 2, in the direction toward the first coolant circulation 14, here through the second heat exchanger 12, through a setting of the 3.2 way valve 3 corresponding to that in FIG. 1, back in the direction toward the second coolant circulation 16, here through the first heat exchanger 10 and from there through the appropriately switched 3/2 way valve 1 in the direction toward the pump of the second coolant circulation 16. Correspondingly, but conversely to the above described case, a two-stage cooling of the air conducted into the motor vehicle interior, and an especially substantial heating of the coolant in the second coolant circulation 16 can consequently be achieved. In this case there is no flow through radiator LTR of the second coolant circulation 16 and the coolant in the first coolant circulation 14 flows only through the heat exchanger WGC, the one pump and the radiator LTR, however not in the direction toward the heat exchangers.

Figure 3:
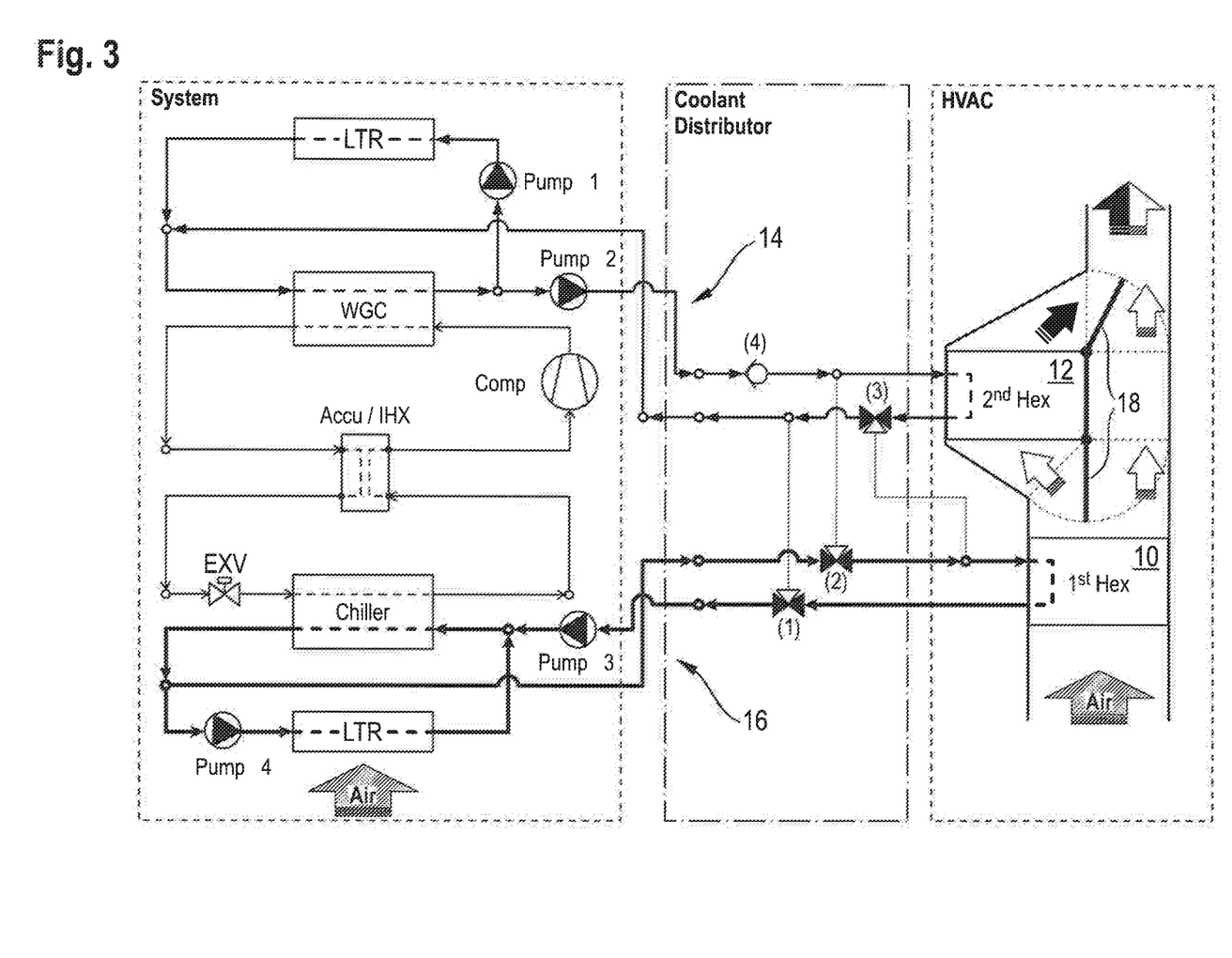

In the dehumidification operation shown in FIG. 3 the coolant flows only in "its" coolant circulation. Stated differently, the coolant of the first coolant circulation 14 is conducted through the second heat exchanger 12 and heats the air, while the coolant of the second coolant circulation 16 is conducted through the first heat exchanger 10 and cools the air. Through the suitable setting of the louvers 18 on the far right, which are both closed in the operating modes of FIGS. 1 and 2 in order to achieve flow through the second heat exchanger 12, in the operating mode of FIG. 3 a mixing of cooled and heated air can take place. The air is hereby advantageously dehumidified and the temperature made uniform. Stated differently, in this operating mode there is no flow in the connections, shown in the Figure in the vertical direction, between the two coolant circulations 14, 16.

In the operating mode shown in FIG. 3 the coolant flows in the particular coolant circulation 14, 16 also through the radiator LTR.

Figure 4:
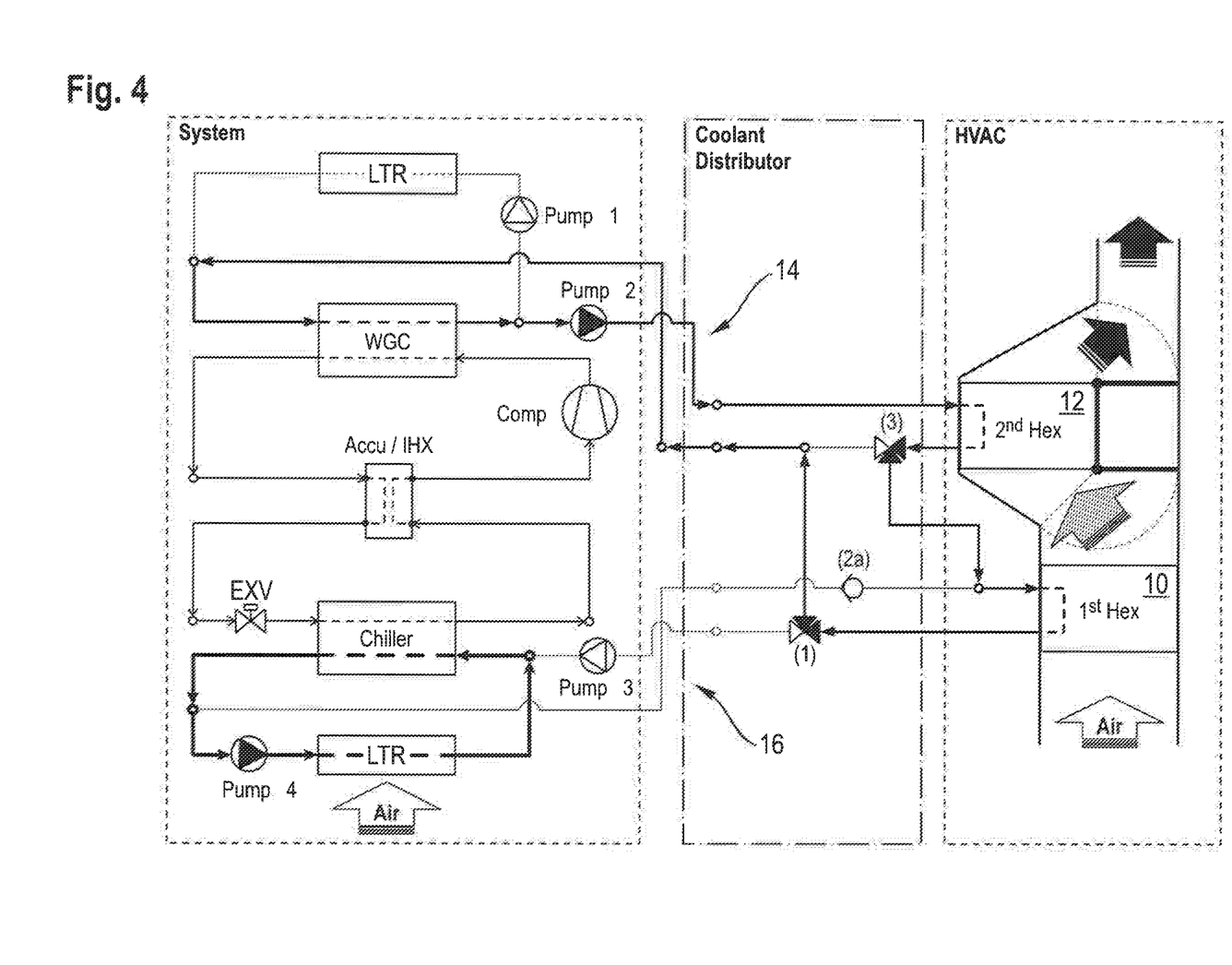
Figure 5:
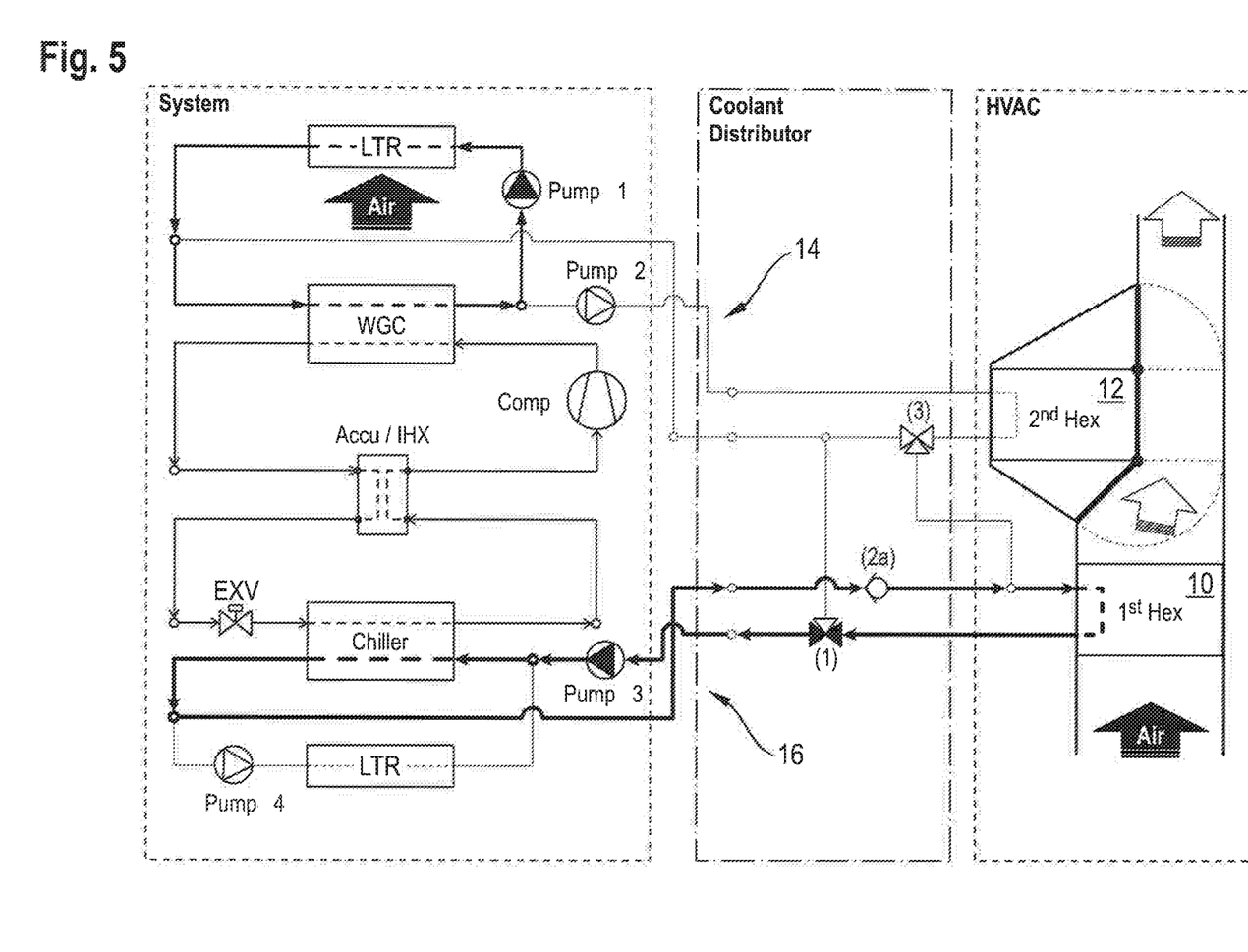
Figure 6:
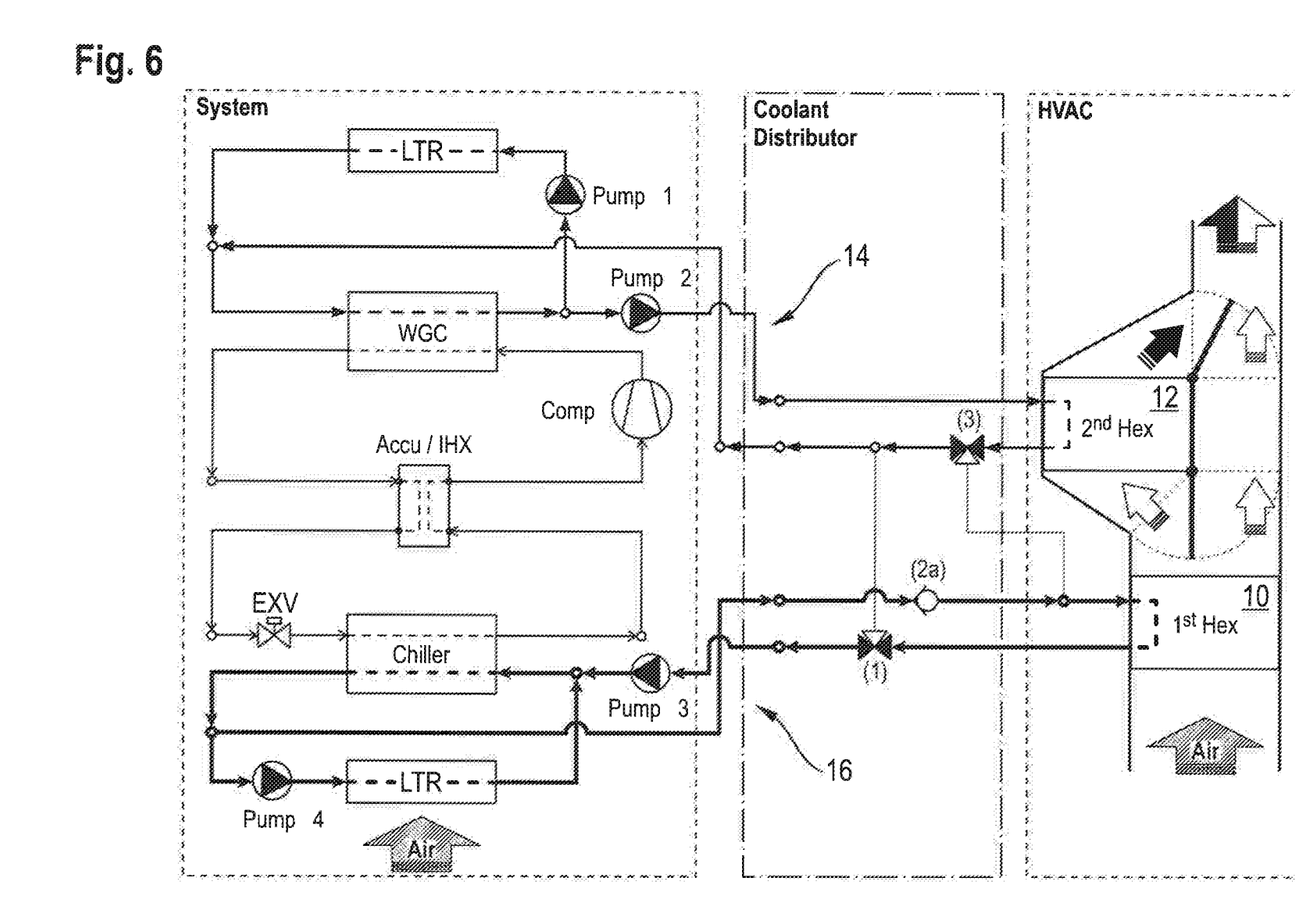

The embodiment of FIGS. 4 to 6 differs from that of FIGS. 1 to 3 by the omission of the 3.2 way valve, labeled 2 in FIGS. 1 to 3, and of the shut-off valve 4. Hereby expenditures can advantageously be saved. Instead of valve 2, an optional shut-off valve 2a is provided that prevents a backflow to the pump of the second coolant circulation 16. However, the function of the shut-off valve 2a can also be assumed by the pump disposed in the direction toward the heat exchanger 10 and not directly upstream of radiator LTR. The heating operation depicted in FIG. 4 does not differ from that according to FIG. 1 and therefore reference is made thereto.

The cooling operation depicted in FIG. 5 differs in so far as the coolant in the second coolant circulation 16 flows only through the first heat exchanger 10 and consequently only a single-stage cooling takes place. The dehumidification operation shown in FIG. 6 corresponds to that shown in FIG. 3 and will therefore not be described again.

Figure 7:
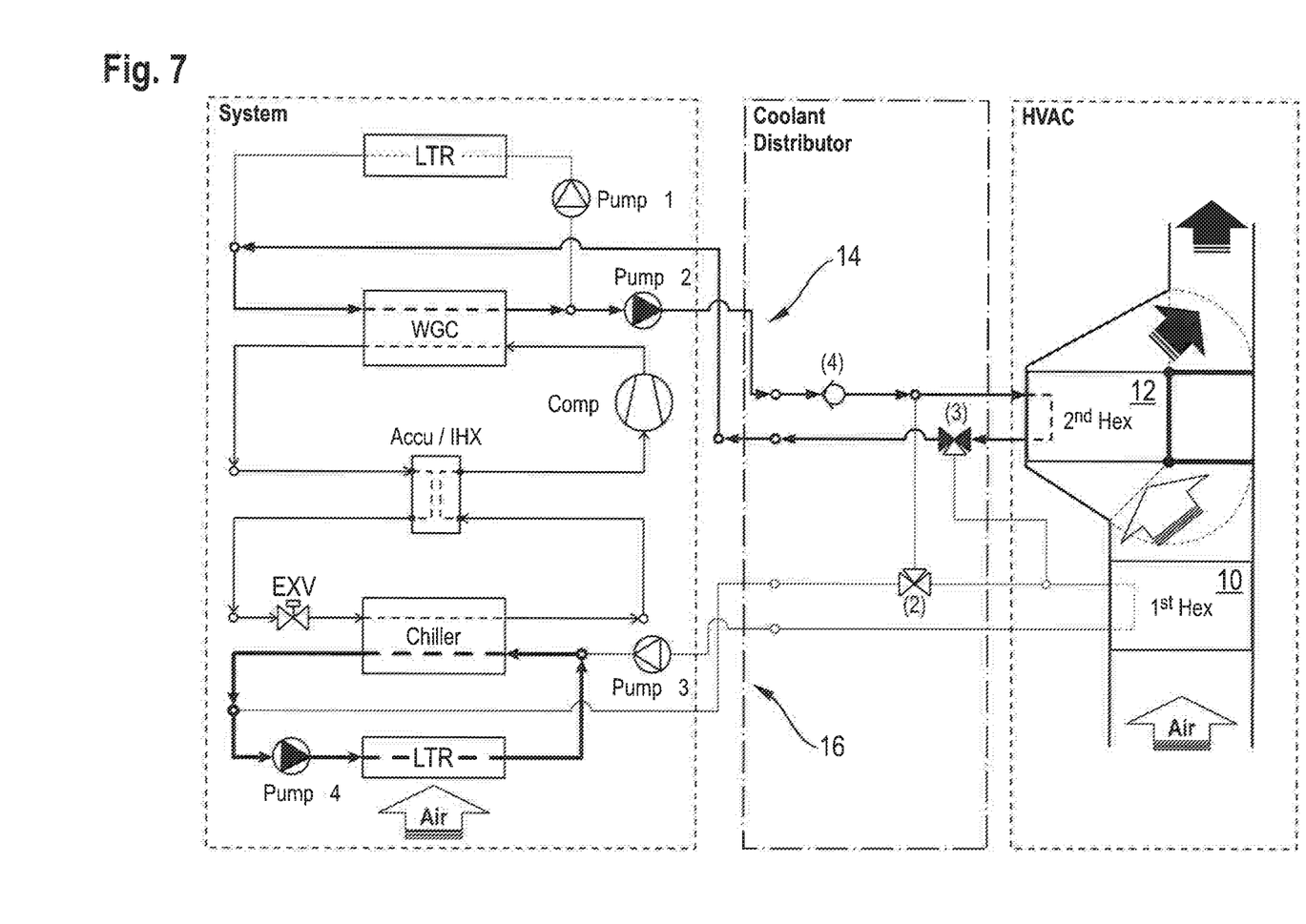
Figure 8:
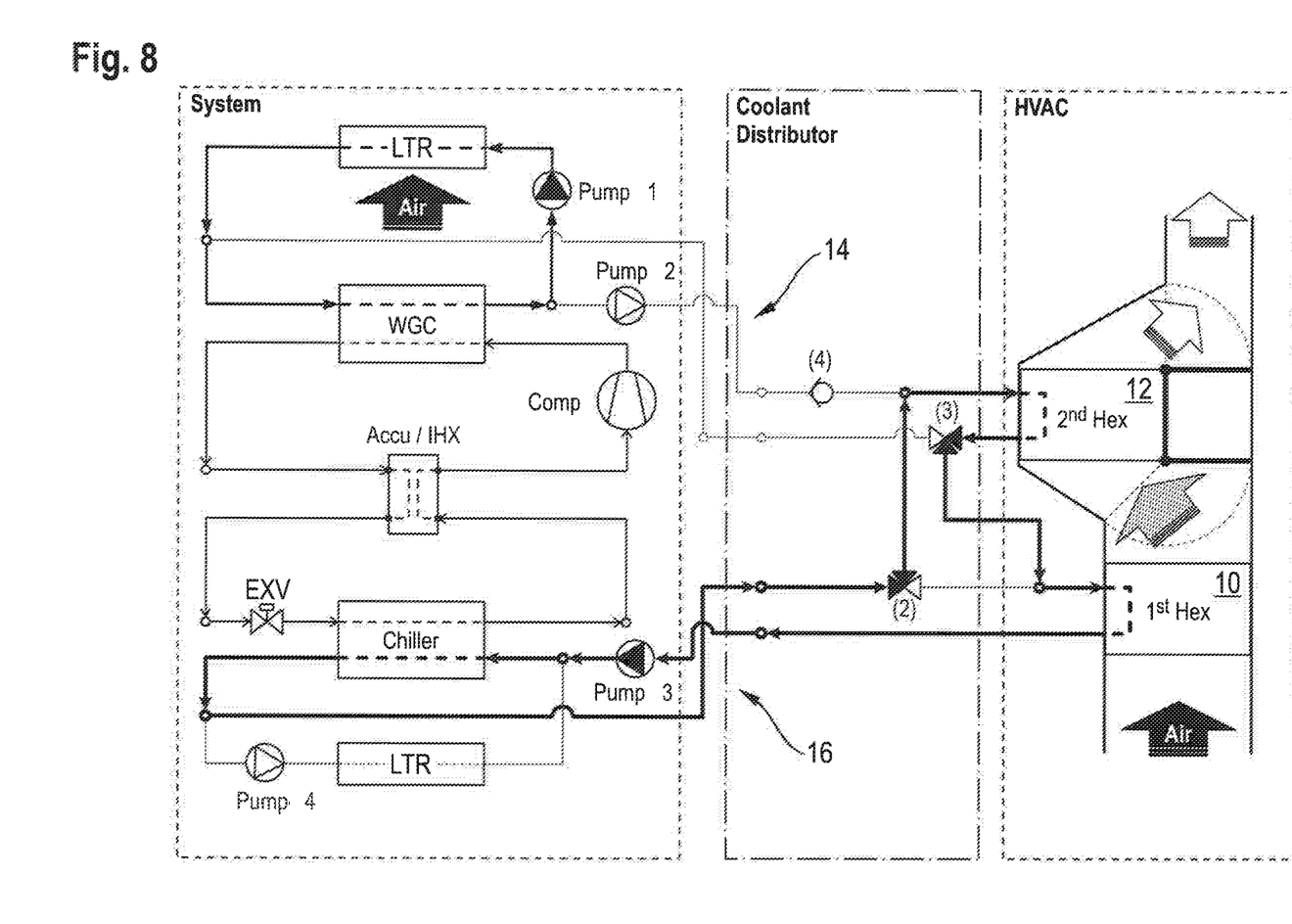
Figure 9:
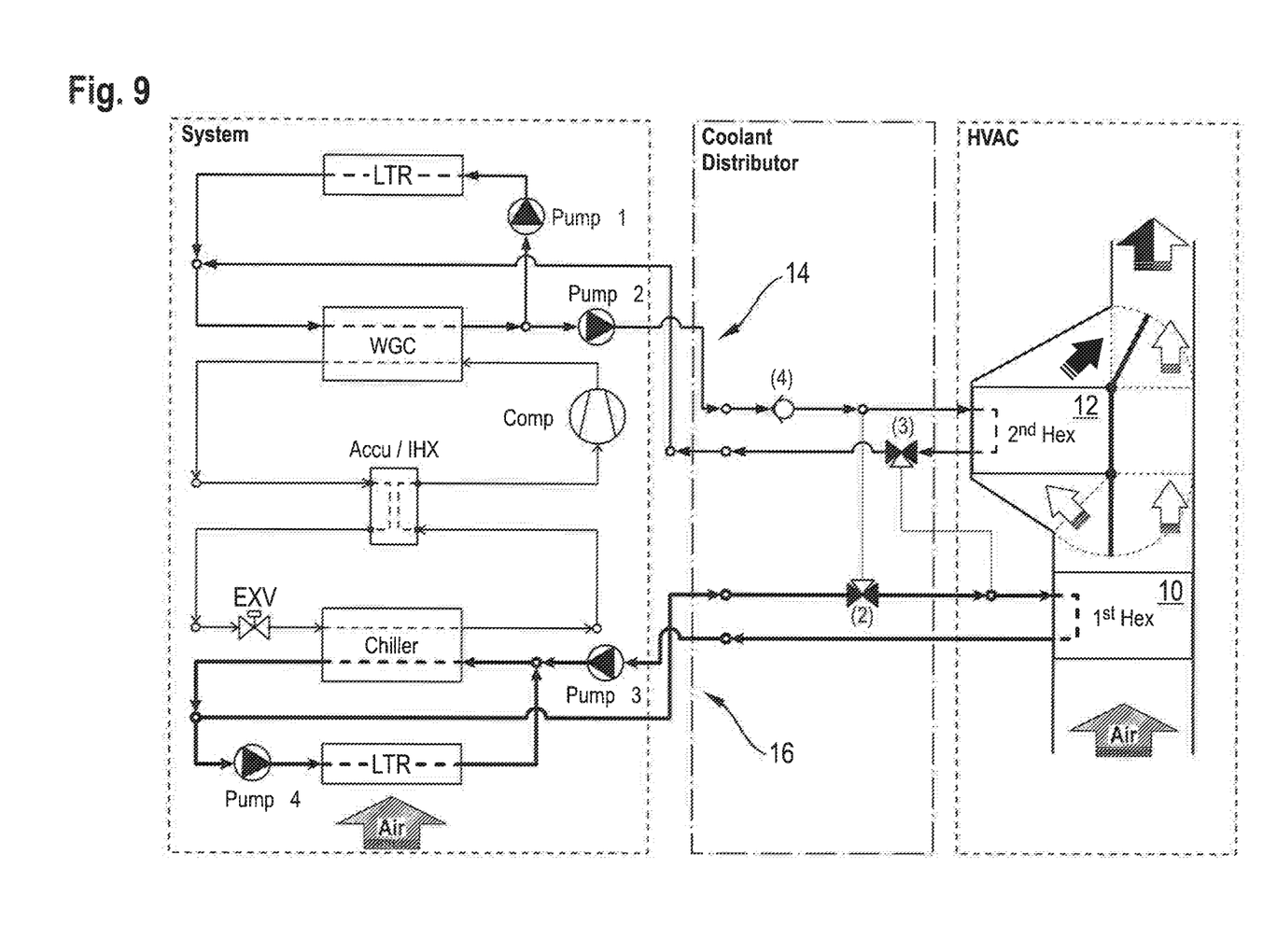

In the third embodiment according to FIGS. 7 to 9 the 3/2 way valve, labeled 1 in FIGS. 1 to 6, is omitted such that, as shown in FIG. 7 the heating operation is only carried out in a single stage and in this respect no flow of the coolant from the first coolant circulation 14 through the second coolant circulation 16 takes place. As can be seen in FIG. 8, a two-stage cooling operation continues to be enabled which insofar corresponds to FIG. 2 and does not need to be described again. This applies similarly to the equally possible dehumidification operation according to FIG. 9, which corresponds to that of FIGS. 3 and 6. In comparison to the shut-off valve 2a of FIGS. 4 to 6, in the embodiment of FIGS. 7 to 9 a shut-off valve 4 is provided to prevent the backflow to the pump of the first coolant circulation 16.

Even though in the Figures two heat exchangers 10, 12 are depicted, more heat exchangers can also be provided. Moreover, several heat pump systems, each with two or more heat exchangers, can also be provided.

The invention claimed is:

1. A heat pump system for a motor vehicle comprising
at least two heat exchangers disposed within a cabin air stream of a motor vehicle, through which a flow is conducted,
at least two coolant circulations that are separable from one another, at least one of which is connectable to at least one of the at least two heat exchangers independently of the other coolant circulation, and
a distributor selectively connects any one of the at least two coolant circulation to at least one of the at least two heat exchangers such that a coolant from any one of the at least two coolant circulations can flow through the at least two heat exchangers in series.

2. A heat pump system according to claim 1, wherein at least two 3/2 way valves or at least four shut-off valves are provided.

3. A heat pump system according to claim 2, wherein one of the at least two 3/2 way valves has a direct inlet from one of the at least two coolant circulation and an outlet in the direction toward the other of the at least two coolant circulations.

4. A heat pump system according to claim 3, further comprising at least one shut-off or check valve is provided which prevents a backflow of coolant to a pump of one of the at least two coolant circulations.

5. A heat pump system according to claim 3, further comprising at least one shut-off or check valve is provided which prevents a backflow of coolant to a pump of one of the at least two coolant circulations.

6. A heat pump system according to claim 3, wherein at least one of the at least two heat exchangers comprises a drainage for the moisture extracted from the air of the cabin room.

7. A heat pump system according to claim 2, further comprising at least one shut-off or check valve is provided which prevents a backflow of coolant to a pump of one of the at least two coolant circulations.

8. A heat pump system according to claim 2, wherein at least one of the at least two heat exchangers comprises a drainage for the moisture extracted from the air of the cabin room.

9. A heat pump system according to claim 1, further comprising at least one shut-off or check valve which prevents a backflow of coolant to a pump of one of the at least two coolant circulations.

10. A heat pump system according to claim 9, wherein at least one of the at least two heat exchangers comprises a drainage for the moisture extracted from the air of the cabin room.

11. A heat pump system according to claim 9, wherein both coolant circulations are connected with a common refrigerant circulation.

12. A heat pump system according to claim 1, wherein both coolant circulations are connected with a common refrigerant circulation.

13. A heat pump system according to claim 12, wherein at least one of the at least two heat exchangers comprises a drainage for the moisture extracted from the air of the cabin room.

14. A heat pump system according to claim 1, wherein at least one of the at least two heat exchangers comprises a drainage for the moisture extracted from the air of the cabin room.

15. A heat pump system according to claim 1, wherein both coolant circulations are connected with a common refrigerant circulation.

16. A heat pump system for a motor vehicle comprising
at least two heat exchangers disposed within a heating, ventilation and air conditioning (HVAC) system for heating and/or cooling the interior of a motor vehicle, through which a flow is conducted,
at least two coolant circulations that are separable from one another, at least one of which is connectable to at least one of the at least two heat exchangers independently of the other coolant circulation, and
a distributor selectively connects any one of the at least two coolant circulation to at least one of the at least two heat exchangers such that a coolant from any one of the at least two coolant circulations can flow through the at least two heat exchangers in series;
wherein at least two 3/2 way valves or at least four shut-off valves are provided; and
wherein one of the at least two 3/2 way valves comprises a direct inlet from one of the at least two heat exchangers, an outlet in the direction toward one coolant circulation and an outlet in the direction toward another coolant circulation.

17. A heat pump system according to claim 16, further comprising at least one shut-off or check valve is provided which prevents a backflow of coolant to a pump of one of the at least two coolant circulations.

18. A heat pump system according to claim 16, wherein at least one of the at least two heat exchangers comprises a drainage for the moisture extracted from the air of the interior.

19. A heat pump system for a motor vehicle comprising
at least two heat exchangers disposed within a heating, ventilation and air conditioning (HVAC) system for heating and/or cooling the interior of a motor vehicle, through which a flow is conducted,
at least two coolant circulations that are separable from one another, at least one of which is connectable to at least one of the at least two heat exchangers independently of the other coolant circulation, and
a distributor selectively connects any one of the at least two coolant circulation to at least one of the at least two heat exchangers such that a coolant from any one of the at least two coolant circulations can flow through the at least two heat exchangers in series,
wherein one of the at least two 3/2 way valves has a direct inlet from one of the at least two coolant circulation and an outlet in the direction toward the other of the at least two coolant circulations, and
wherein one of the at least two 3/2 way valve comprises a direct inlet from at least one of the two heat exchangers, an outlet in the direction toward one coolant circulation and an outlet in the direction toward another coolant circulation.

* * * * *